United States Patent
Lee et al.

(10) Patent No.: US 10,712,607 B2
(45) Date of Patent: Jul. 14, 2020

(54) OPTICAL DEVICE

(71) Applicant: LG CHEM, LTD, Seoul (KR)

(72) Inventors: Seong Min Lee, Daejeon (KR); Ji Hoon Park, Daejeon (KR); Byoung Kun Jeon, Daejeon (KR); Seung Hun Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/767,631

(22) PCT Filed: Oct. 26, 2016

(86) PCT No.: PCT/KR2016/012065
§ 371 (c)(1),
(2) Date: Apr. 11, 2018

(87) PCT Pub. No.: WO2017/074007
PCT Pub. Date: May 4, 2017

(65) Prior Publication Data
US 2018/0284536 A1    Oct. 4, 2018

(30) Foreign Application Priority Data
Oct. 26, 2015 (KR) .................... 10-2015-0148738

(51) Int. Cl.
*G02F 1/1335* (2006.01)
*G02F 1/1333* (2006.01)
(Continued)

(52) U.S. Cl.
CPC .......... *G02F 1/133528* (2013.01); *B60J 3/04* (2013.01); *C08J 5/18* (2013.01); *G02B 5/30* (2013.01); *G02B 5/3008* (2013.01); *G02F 1/1333* (2013.01); *G02F 1/1339* (2013.01); *G02F 2001/133302* (2013.01);
(Continued)

(58) Field of Classification Search
CPC ............ G02F 1/133528; G02F 1/1333; G02F 1/1339; G02F 2001/133302; G02F 2001/133531; G02F 2201/54; G02F 2202/04; G02F 2202/28; B60J 3/04;
(Continued)

(56) References Cited

U.S. PATENT DOCUMENTS

| 4,740,543 A | * | 4/1988 | Matsuno | ................. C08K 7/14 |
| | | | | 524/209 |
| 5,415,912 A | * | 5/1995 | Ushizaka | ................. C09J 11/08 |
| | | | | 428/41.4 |

(Continued)

FOREIGN PATENT DOCUMENTS

| JP | S53134478 | 11/1978 |
| JP | S60-169620 | 11/1985 |

(Continued)

OTHER PUBLICATIONS

International Search Report and the Written Opinion of PCT/KR2016/01205, dated Jan. 23, 2018.

*Primary Examiner* — Nathanael R Briggs
(74) *Attorney, Agent, or Firm* — Dentons US LLP

(57) ABSTRACT

An optical device and a use thereof are provided. The optical device is a member in which transmittance can vary depending on whether or not an external action is present, and has excellent durability.

12 Claims, 2 Drawing Sheets

(51) Int. Cl.
  *G02B 5/30* (2006.01)
  *B60J 3/04* (2006.01)
  *C08J 5/18* (2006.01)
  *G02F 1/1339* (2006.01)

(52) U.S. Cl.
  CPC ............ *G02F 2001/133531* (2013.01); *G02F 2201/54* (2013.01); *G02F 2202/04* (2013.01); *G02F 2202/28* (2013.01)

(58) Field of Classification Search
  CPC ..... C08J 5/18; E06B 9/24; G02B 5/30; G02B 5/3008
  See application file for complete search history.

(56) References Cited

U.S. PATENT DOCUMENTS

| | | | |
|---|---|---|---|
| 9,958,742 B2 | 5/2018 | Min et al. | |
| 2007/0218217 A1* | 9/2007 | Fernando | C09K 19/586 428/1.31 |
| 2009/0290078 A1* | 11/2009 | Yang | G02F 1/13718 349/16 |
| 2014/0168546 A1 | 6/2014 | Magnusson et al. | |
| 2016/0291357 A1 | 10/2016 | Min et al. | |

FOREIGN PATENT DOCUMENTS

| | | |
|---|---|---|
| JP | S61-069033 | 4/1986 |
| JP | H02-4212 | 1/1990 |
| JP | 2003-050398 | 2/2003 |
| JP | 2004-302464 | 10/2004 |
| JP | 2005031577 | 2/2005 |
| JP | 2007-515661 | 6/2007 |
| JP | 2012113215 | 6/2012 |
| JP | 2016102963 A * | 6/2016 |
| JP | 2017-65945 | 4/2017 |
| KR | 10-2001-0077357 | 8/2001 |
| KR | 10-2006-0087600 | 8/2006 |
| KR | 10-2008-0063347 | 7/2008 |
| KR | 10-2009-0109168 | 10/2009 |
| KR | 10-2014-0070479 | 6/2014 |
| KR | 10-2014-0087610 | 7/2014 |
| KR | 10-2015-0037669 | 4/2015 |
| KR | 10-2015-0105266 | 9/2015 |
| WO | 2015117736 | 8/2015 |
| WO | 2015133878 | 9/2015 |

* cited by examiner

[Figure 1]
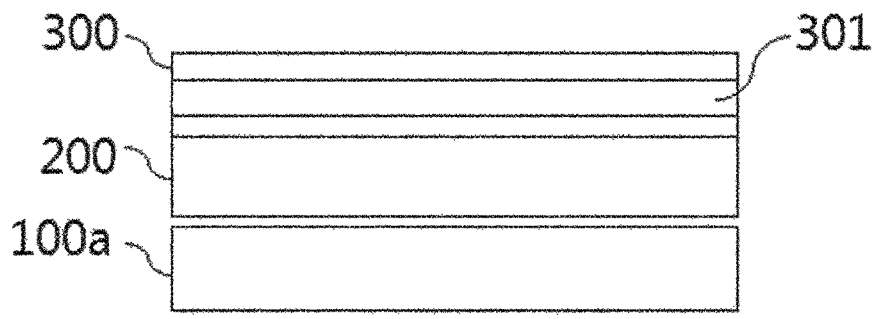
[Figure 2]
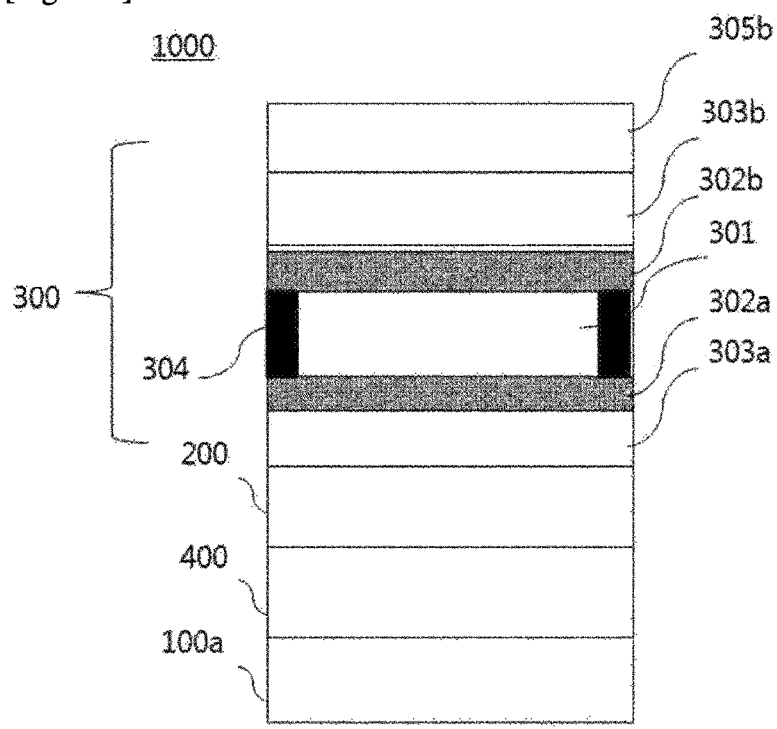

[Figure 3]
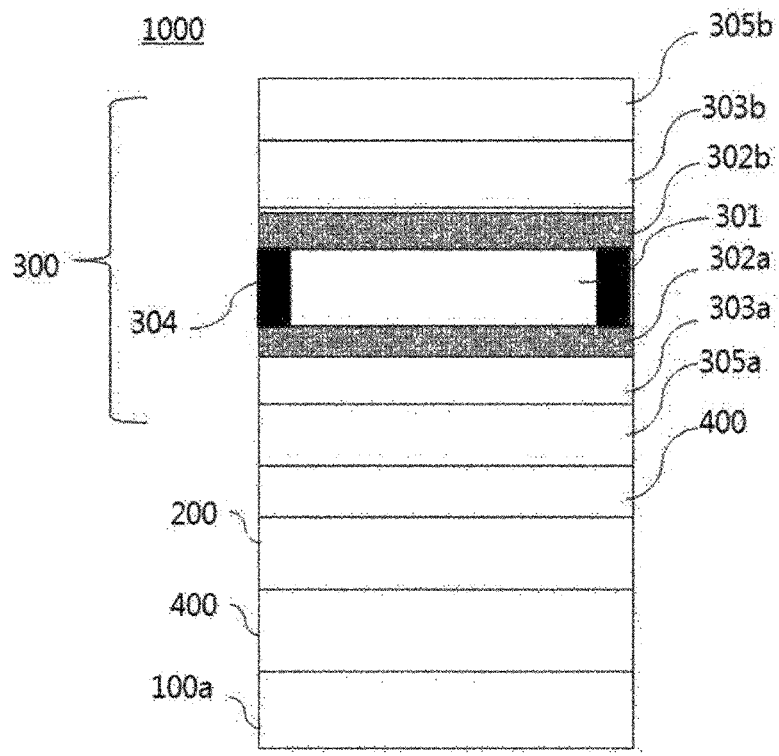
[Figure 4]
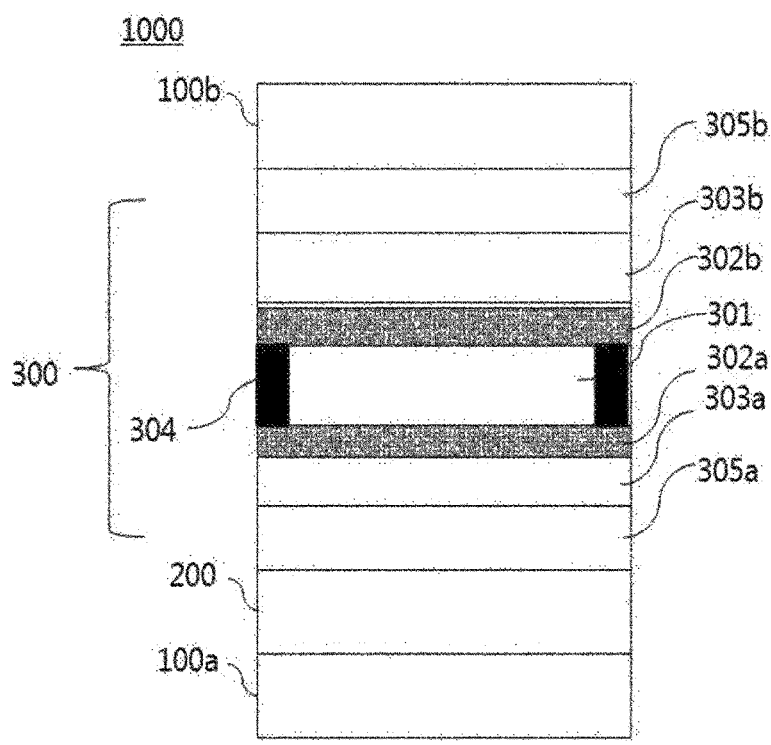

OPTICAL DEVICE

TECHNICAL FIELD

This application is a National Stage Application of International Application No. PCT/KR2016/012065 filed on Oct. 26, 2016, which claims priority to and the benefit of Korean Patent Application No. 10-2015-0148738 filed on Oct. 26, 2015, both of which are incorporated herein in their entirety by reference for all purposes as if fully set forth herein.

TECHNICAL FIELD

The present application relates to an optical device and a use thereof.

BACKGROUND ART

A sunroof usually means a fixed or operating (venting or sliding) opening that is present in the ceiling of a vehicle and serves to allow light or fresh air to enter the interior of the vehicle. Such a sunroof may be operated manually or driven by a motor, and there are various kinds in the shape, size or style of the sunroof according to the intended use. For example, the sunroof is classified, according to the operating method, as a pop-up type sunroof, a spoiler (tile & slide) type sunroof, an in-built type sunroof, a folding type sunroof, a top-mount type sunroof, a panoramic loop system type sunroof, a removable roof panels (t-tops or targa roofs) type sunroof or a solar type sunroof, and the like. Also, research on the material of the sunroof is actively under way, and for example, Patent Document 1 discloses a technique of manufacturing a sunroof having excellent absorption of ultraviolet and solar rays using a glass composition of a specific composition.

DISCLOSURE

Technical Problem

The present application provides an optical device in which transmittance varies depending on whether or not an external action is applied.

The optical device of the present application can effectively prevent deterioration of durability by thermal deformation.

Technical Solution

The present application relates to an optical device and a use thereof.

In the optical device of the present application, the transmittance varies depending on whether or not an external action is applied, and such an optical device can be used as a transmittance variable member, for example, a sunroof for a vehicle, and the like.

The optical device according to the present application can selectively switch between a transmissive mode and a blocking mode by introducing a liquid crystal layer comprising a liquid crystal compound that varies depending on whether or not an external action is applied.

The optical device according to the present application can also effectively prevent a bending phenomenon of the device due to the difference in an elastic modulus and a coefficient of thermal expansion between a substrate and a polarizing layer or between the substrate and other layers by appropriately designing positions and structures of a substrate, a polarizing layer and a liquid crystal layer.

The optical device of the present application has a first substrate; a first polarizing layer located on the first substrate; and a liquid crystal window including a liquid crystal layer having a liquid crystal compound.

FIG. 1 depicts one structure of an optical device according to the present application.

As shown in FIG. 1, the optical device (1000) of the present application has a first substrate (100); a first polarizing layer (200) disposed adjacent to the first substrate (100); and a liquid crystal window (300) including a liquid crystal layer (301) having a liquid crystal compound, which is present on the opposite side of the surface of the first polarizing layer (200) on which the first substrate (100) is located. Also, the transmittance of such an optical device changes depending on whether or not an external action is applied.

In the present application, the term "external action" means an external force capable of changing the orientation of the liquid crystal compound contained in the liquid crystal layer. In one example, the external action may be an external voltage that is induced through an electrode layer as described below.

That is, the optical device according to the present application can selectively implement a transmissive mode and a blocking mode by introducing the liquid crystal window including the liquid crystal layer having the liquid crystal compound whose orientation direction changes by the external action.

In the present application, the term "transmissive mode" may mean a state in which a transmittance of a visible light region is 20% or more, 25% or more, 30% or more, or 40% or more.

In the present application, the term "blocking mode" may mean a state in which a transmittance of a visible light region is 3% or less, 2% or less or 1% or less.

In one example, the optical device of the present application can switch between the transmissive mode in which the transmittance of the visible light region is 20% or more and the blocking mode in which the transmittance of the visible light region is 3% or less, by the external action.

In the terms of describing the structure of the optical device of the present application, "B located or present on A" or "B located or present on A side" means when at least one any other layer is interposed on A and then B is located or present thereon as well as when A is in direct contact with B.

In particular, the term "B disposed adjacent to A" may mean a state that A is in direct contact with B or only one layer is interposed between A and B.

The optical device of the present application may minimize a stress capable of being caused due to the difference in a coefficient of thermal expansion and an elastic modulus among the substrate, the polarizing layer, and a base layer in the liquid crystal window, and ultimately prevent a bending phenomenon of the device and damage of a sealant supporting the liquid crystal layer, by adjacently disposing the first substrate and the first polarizing layer.

In one example, the optical device of the present application may have a bending distance of 3 mm or less after a heat resistance test at a temperature of 100° C. for 240 hours. Since the small bending distance means that deformation due to heat is small, the lower limit value is not particularly limited and may be, for example, 2.8 mm or less, 2.6 mm or less, 2.4 mm or less, 2.2 mm or less, 2.0 mm or less, 1.5 mm or less, 1 mm or less, or 0 mm.

The term "bending distance" in the above may be a value in which after leaving a device specimen of 140 mm (width)×98 mm (length)×0.2 mm (height) at 100° C. for 240 hours, a portion is measured by a vernier caliper, which is deformed and dented inward from both edges of the longest side.

The first substrate of the optical device serves as a supporting body of the device, and for example, a material having appropriate rigidity and low bending characteristics and having appropriate transparency can be used in the present application without limitation.

In one example, the first substrate may be a glass substrate; a crystalline or amorphous silicone film; an inorganic film such as a quartz or ITO film; or a plastic substrate.

In a specific example, as the plastic substrate, one comprising TAC (triacetyl cellulose); COP (cyclo olefin copolymer) such as norbornene derivatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (polyether sulfone); PEEK (polyetheretherketone); PPS (polyphenylsulfone); PEI (polyetherimide); PEN (polyethylenenaphthalate); PET (polyethyleneterephthalate); PI (polyimide); PSF (polysulfone); PAR (polyarylate) or an amorphous fluororesin may be used, but is not limited thereto.

The first substrate may have, for example, a coefficient of thermal expansion (CTE) of 40 ppm/K or less, 30 ppm/K or less, or 20 ppm/K or less. Within such a range of coefficient of thermal expansion (CTE), the appropriate rigidity can be maintained, and the thermal deformation according to the laminated structure of the liquid crystal window, the polarizing layer and the like can be prevented. The lower limit of the coefficient of thermal expansion (CTE) may be, for example, 3 ppm/K or more, 5 ppm/K or more, or 7 ppm/K or more, but is not limited thereto. The value of the coefficient of thermal expansion (CTE) may be, for example, a value calculating the average thermal expansion coefficient measured with cooling and heating at a rate of 10° C./min in a temperature range of 0° C. to 100° C. as a coefficient of linear expansion.

The first substrate may have, for example, an elastic modulus of 20 GPa or more, 30 GPa or more, 40 GPa or more, or 50 GPa or more. Within such a range of elastic modulus, the appropriate rigidity can be maintained, the thermal deformation according to the laminated structure of the liquid crystal window, the polarizing layer and the like can be prevented. The upper limit of the elastic modulus may be, for example, 150 GPa or less, 100 GPa or less, or 80 GPa or less, but is not limited thereto. The elastic modulus value may mean a value measured according to ASTM D882.

The first polarizing layer is disposed adjacent to the first substrate. As described above, the adjacent arrangement may mean that the first polarizing layer is in direct contact with the first substrate without interposing any other layer or the first polarizing layer is attached to the first substrate via any other one layer, for example, a pressure-sensitive adhesive layer or an adhesive layer, which is described below.

In one example, the first polarizing layer may be in contact with the first substrate, or be attached to the first substrate via a pressure-sensitive adhesive layer or an adhesive layer.

In the present invention, the term "polarizing layer" may mean a functional layer that exhibits selective transmission and blocking properties, for example, reflection or absorption properties, for incident light. The polarizing layer may have, for example, a function of transmitting light which vibrates in one direction from incident light which vibrates in various directions, and blocking light which vibrates in the other directions.

The type of the polarizing layer is not particularly limited, and a reflective type, an absorptive type, or a scattering type of polarizing layer, and the like can be exemplified.

As the reflective polarizing layer, for example, a DBEF (dual brightness enhancement film), a lyotropic liquid crystal layer (LLC layer), a wire grid polarizer or the like can be used, and as the absorptive polarizing layer, a polarizer, in which iodine is dyed on a polymer stretched film such as a PVA stretched film, or a guest-host polarizing layer, in which the host is liquid crystals polymerized in an oriented state and the guest is anisotropic dye arranged in accordance with the orientation of the liquid crystals, can be used, without being limited thereto.

The first polarizing layer may have a predetermined absorption axis.

In one example, the absorption axis of the first polarizing layer and the optical axis of the liquid crystal layer may be formed at an angle of, for example, 0 to 90 degrees in the absence of the external action. By controlling the angle between the absorption axis of the first polarizing layer and the optical axis of the liquid crystal layer within the angular range, the transmittance of light in the visible light region can be adjusted.

In the present application, the term "optical axis" may mean a slow axis when the incident light passes through the relevant region, and when the liquid crystal compound has a rod shape, it may mean the long axis direction of the rod and when the liquid crystal compound has a discostic shape, it may mean the normal direction of the disc surface.

For example, the liquid crystal compound in the liquid crystal layer may be in a horizontal orientation, a vertical orientation, or an oblique orientation, where the angle between the absorption axis of the first polarizing layer and the optical axis of the liquid crystal layer may vary depending on the orientation state of such a liquid crystal compound.

The optical device of the present application may include not only a case where a polarizing layer exists on any one side of a liquid crystal layer but also a structure where a liquid crystal layer exists between two opposing polarizing layers, depending on the type of the liquid crystal layer.

In one example, the optical device of the present application may further comprise a second polarizing layer located on the opposite side of the surface on which the first polarizing layer of the liquid crystal window is located.

The absorption axis of the second polarizing layer may be, for example, vertical to the absorption axis of the first polarizing layer. In the present application, the term "vertical" means substantially vertical, and it can be understood that it includes errors within ±5 degrees, ±4 degrees, ±3 degrees, ±2 degrees.

The optical device of the present application comprises a liquid crystal window. The liquid crystal window comprises a liquid crystal layer having a liquid crystal compound.

The liquid crystal window may play a role of imparting transmittance variable characteristics to the optical device by comprising a liquid crystal layer having a liquid crystal compound whose orientation changes depending on the presence or absence of an external action.

The liquid crystal compound contained in the liquid crystal layer, the orientation direction of which can be changed depending on the presence or absence of the external action, can be used without limitation in the present application.

In one example, as the liquid crystal compound, a smectic liquid crystal compound, a nematic liquid crystal compound, or a cholesteric liquid crystal compound, and the like may be used. In addition, the liquid crystal compound may be, for example, a compound which has no polymerizable group or crosslinkable group, so that the orientation direction can be changed by application of the external signal.

In one example, as the liquid crystal compound, a nematic liquid crystal compound can be used. As the above compound, for example, a nematic liquid crystal compound satisfying the following Equation 1 can be used.

$$(1.53-b) < \{(2n_o^2+n_e^2)/3\}^{0.5} < (1.53+b)$$ [Equation 1]

In Equation 1, $n_o$ is an ordinary refractive index of the liquid crystal compound, for example, a refractive index in the uniaxial direction of the nematic liquid crystal compound, $n_e$ is an extraordinary refractive index of the liquid crystal compound, for example a refractive index in the long axis direction of the liquid crystal compound, and b is a number satisfying 0.1=b=1. The liquid crystal compound satisfying Equation 1 can be selected to manufacture a liquid crystal cell in which excellent transparency can be ensured even when no voltage is applied. In Equation 1, b may be, in another example, 0.1 to 0.9, 0.1 to 0.7, 0.1 to 0.5 or 0.1 to 0.3.

The liquid crystal compound may also have a difference between an extraordinary dielectric anisotropy ($\varepsilon_e$, dielectric anisotropy of the long axis direction) and an ordinary dielectric anisotropy ($\varepsilon_o$, dielectric anisotropy of the uniaxial direction) of at least 3, at least 3.5, at least 4, at least 6, at least 8, or at least 10. Having such a dielectric anisotropy, a device having excellent driving voltage characteristics can be provided. In the difference of the dielectric anisotropy, the higher the numerical value is, the device may exhibit more appropriate characteristics, where the upper limit is not particularly limited. For example, as the liquid crystal compound, a compound having an extraordinary dielectric anisotropy ($\varepsilon_e$, dielectric anisotropy of the long axis direction) of 6 to 50 and an ordinary dielectric anisotropy ($\varepsilon_o$, dielectric anisotropy of the uniaxial direction) of 2.5 to 7 may be used.

The liquid crystal layer may further comprise an anisotropic dye.

In the present application, the term "dye" may mean a material capable of intensively absorbing and/or deforming light in at least some or all the range within a visible light region, for example, a wavelength range of 400 nm to 700 nm, and the term "anisotropic dye" may mean a material allowing anisotropic absorption of light in at least some or all the range of the visible light region.

The light transmittance of the optical device can be controlled through using the anisotropic dye as above. Although the anisotropic dye is not particularly limited, for example black dyes or color dyes can be used.

As the anisotropic dye, a dye having a dichroic ratio, that is, a value dividing the absorption of the polarized light parallel to the long axis direction of the anisotropic dye by the absorption of the polarized light parallel to the direction vertical to the long axis direction, of at least 5, at least 6 or at least 7, can be used. The dye can satisfy the dichroic ratio in at least some wavelengths or at any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less. The kind of the anisotropic dye is not particularly limited, and for example, all kinds of dyes known to have characteristics capable of being oriented according to orientation of the liquid crystal compound while having the above characteristics, can be used.

When the anisotropic dye is contained in the liquid crystal layer, it does not need to include the above-described second polarizing layer in the device, and it is possible to promote for the optical device to be made thinner.

That is, when the liquid crystal compound and the anisotropic dye are included in the optical device, the orientation of the liquid crystal compound and the anisotropic dye present in the liquid crystal layer is controlled, so that the anisotropic light absorption may be controlled for the polarized light of the direction parallel to the orientation direction of the anisotropic dye and the polarized light of the direction vertical thereto.

For example, the orientation of the liquid crystal compound and/or the anisotropic dye in the liquid crystal layer can be controlled by application of the external signal, and accordingly the liquid crystal layer can control the anisotropic light absorption depending on whether or not the external signal is applied. The liquid crystal layer having such characteristics can be referred to as a so-called active polarizer, and by controlling the relationship between the transmission axis and/or the absorption axis of the polarizing layer in the presence of the external action as described above, the overall transmittance of the optical device can be controlled.

Such an anisotropic dye may be included in the liquid crystal layer, for example, in a ratio of 1 to 10 parts by weight or 1 to 5 parts by weight, relative to 100 parts by weight of the liquid crystal compound.

The liquid crystal compound may have a certain orientation and be contained in the liquid crystal layer.

In one example, the liquid crystal compound may be in a horizontal orientation, a vertical orientation, or an oblique orientation in the absence of the external action.

In the present application, the term "horizontal orientation" may mean a case where the optical axis of the liquid crystal layer has an inclination angle within a range of about 0 to 15 degrees, about 0 to 10 degrees, and about 0 to 5 degrees with respect to the plane of the liquid crystal layer.

In the present application, the term "vertical orientation" may mean a case where the optical axis of the liquid crystal layer has an inclination angle of about 90 to 85 degrees with respect to the plane of the liquid crystal layer.

In the present application, the term "oblique orientation" may mean a case where the optical axis of the liquid crystal layer has an inclination angle other than the horizontal orientation or the vertical orientation with respect to the plane of the liquid crystal layer, and for example, may mean a case where the optical axis of the liquid crystal layer has an inclination angle of more than about 15 degrees to less than 85 degrees with respect to the plane of the liquid crystal layer.

The orientation condition of such a liquid crystal compound can be appropriately adjusted in consideration of the drive mode of the liquid crystal window and the dielectric anisotropy characteristics of the liquid crystal compound.

The liquid crystal layer may have predetermined plane direction retardation (Rin) and thickness direction retardation (Rth).

In one example, the plane direction retardation (Rin) of the liquid crystal layer in a state that the liquid crystal compound is horizontally oriented in the liquid crystal layer may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, or 140 nm or more. In addition, the upper limit of the plane direction retardation of the liquid crystal layer in the absence of any external action may be 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, or 160 nm or less.

Furthermore, in a state where the external action is present and the liquid crystal compound is vertically oriented, the thickness direction retardation (Rth) of the liquid crystal layer may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, or 140 nm or more. In addition, when the external action is present, the upper limit of the thickness direction retardation of the liquid crystal layer may be 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, or 160 nm or less.

In the present application, the term "plain direction retardation (Rin)" is a numerical value calculated by the following formula 1, and the term "thickness direction retardation (Rth)" is a numerical value calculated by the following formula 2.

$$Rin = (nx - ny) \times d \quad \text{[Formula 1]}$$

$$Rth = (nz - ny) \times d \quad \text{[Formula 2]}$$

In Formulas 1 and 2, the symbols of nx, ny, nz and d mean a refractive index in the in-plane slow axis direction, a refractive index in the in-plane fast axis direction, a refractive index in the thickness direction, and a thickness, respectively. Each of the refractive indices may be, for example a refractive index measured for light having a wavelength of 550 nm.

Depending on the orientation of the liquid crystal compound, the transmittance of the optical device can be controlled.

The liquid crystal window may be driven in an ECB (Electrically Controlled Birefringence) mode, a TN (Twisted Nematic) mode or an STN (Super Twisted Nematic) mode, without being limited thereto, and the alignment characteristics of the liquid crystal compound in the liquid crystal layer may be changed depending on the drive mode of such a liquid crystal window.

In one example, the liquid crystal compound is present in an oriented state to form an angle with the absorption axis of the first polarizing layer, or in a state oriented to be horizontal or vertical to the absorption axis of the first polarizing layer, or in a twist oriented state.

In the present application, the term "twist oriented state" may mean a state where the optical axis of the liquid crystal layer is oriented horizontally with an inclination angle within a range of about 0 to 15 degrees, about 0 to 10 degrees or about 0 to 5 degrees with respect to the plane of the liquid crystal layer, but the angle of the long axis direction of the neighboring liquid crystal compound contained in the liquid crystal layer slightly varies and is twisted and arranged.

As described above, the alignment property of the liquid crystal compound in the liquid crystal layer can be changed by application of the external action.

In one example, in the absence of the external action, when the liquid crystal layer is in a horizontal orientation, the transmittance can be increased by switching to a vertical orientation state by application of the external action.

In another example, in the absence of the external action, when the liquid crystal layer is in a vertical orientation, the transmittance can be reduced by switching to a horizontal orientation state by application of the external action. In addition, in switching from the initial vertical orientation state to the horizontal orientation state, a pre-tilt in a certain direction may be required to determine the orientation direction of the liquid crystal compound. Here, the method of imparting the pre-tilt is not particularly limited, and for example, it is allowed by disposing an alignment film, so that the intended pre-tilt may be imparted.

In addition, in a state where the liquid crystal layer further comprises an anisotropic dye and the liquid crystal compound is vertically oriented in the above, the alignment direction of the anisotropic dye is vertical to the plane of the polarizing layer present in the bottom, and thus the light transmitted through the polarizing layer can be transmitted without being absorbed by the anisotropic dye of the liquid crystal layer, thereby increasing the transmittance of the optical device. On the other hand, in a state where the liquid crystal compound in the liquid crystal layer is horizontally oriented, the alignment direction of the anisotropic dye is parallel to the plane of the polarizing layer present in the bottom, and thus when the optical axis of the liquid crystal layer is disposed to have a predetermined angle for the absorption axis of the polarizing layer, a part of the light transmitted through the polarizing layer can be absorbed by the anisotropic dye, thereby reducing the transmittance of the optical device.

In one example, in the optical device, a transmissive mode in which the transmittance of the visible light region is 20% or more can be realized in a state where the external action is present, and a blocking mode in which the transmittance of the visible light region is 3% or less can be realized in a state where the external action is not present.

When the liquid crystal window is driven in the TN mode or the STN mode, the liquid crystal layer may further comprise a chiral agent. The chiral agent can induce for the molecular arrangement of the liquid crystal compound and/or the anisotropic dye to have a helical structure. The chiral agent may be used without particular limitation, as long as it can induce the desired helical structure without damaging liquid crystallinity, for example, nematic regularity. The chiral agent for inducing the helical structure in the liquid crystal needs to include at least the chirality in the molecular structure. As the chiral agent, for example, compounds having one or two or more asymmetric carbons, compounds having an asymmetric point on a heteroatom such as chiral amines or chiral sulfoxides, or compounds having an axially asymmetric and optically active site such as cumulene or binaphthol can be exemplified. The chiral agent may be, for example, a low molecular compound having a molecular weight of 1,500 or less. As the chiral agent, a commercially available chiral nematic liquid crystal, for example, a chiral dopant liquid crystal S-811 available from Merck Co. or LC756 from BASF may be also used.

The thickness of the liquid crystal layer may be, for example, in a range of 5 to 30 μm. It is possible within such a thickness range to appropriately adjust the transmittance and to prevent the bending phenomenon due to thermal deformation, and accordingly damage of the liquid crystal layer, and the like.

The liquid crystal layer may be prepared, for example, by using a method of squeezing a composition comprising the aforementioned liquid crystal compound and/or anisotropic dye and other additives on substrates disposed apart from each other while sealing the sides, or by coating the composition on any substrate and then laminating the peeled film with a base layer, or by a known method of forming a liquid crystal layer, such as a formation method of coating the composition directly on a base layer and then curing the composition.

The liquid crystal window may further comprise an alignment film disposed adjacent to the liquid crystal layer. The alignment film is a configuration adopted to control the alignment state of the liquid crystal compound and the anisotropic dye which may be further included, and may be included in the liquid crystal window in an arrangement capable of achieving the above purpose, for example, in a state in which the alignment film is in direct contact with both side of the liquid crystal layer.

As the alignment film, a known vertical, horizontal or tilt alignment film can be used without any particular limitation. Such an alignment film may be a contact type alignment film such as a rubbing alignment film or a known alignment film such as a photo-alignment film which comprises a photo-alignment compound, so that it may exhibit orientation characteristics, for example, by a noncontact type method such as irradiation of the linearly polarized light.

That is, the alignment film may be a rubbing alignment film oriented through a known rubbing process or a photo-curable alignment film or a thermosetting alignment film that orientation is imparted by applying a composition for forming an alignment film thereto and then irradiating it with light or heat.

The rubbing alignment film may be formed by a process of rubbing a resin such as polyimide or polyvinyl alcohol at a predetermined pressure and number of times with a rubbing cloth or the like.

The photo alignment film may comprise, for example, a photo-alignment compound.

In the present application, the term "photo-alignment compound" may mean a compound aligned in a predetermined direction (orientationally ordered) through irradiation of light and capable of orienting a neighboring liquid crystal compound in a predetermined direction through an interaction such as an anisotropic interaction in the aligned state.

In the photo-alignment film, the photo-alignment compound may exist in an aligned state so as to have orientation. The photo-alignment compound may be a monomolecular compound, a monomeric compound, an oligomeric compound or a polymeric compound. In addition, the photo-alignment compound may be a compound comprising a photosensitive moiety.

Specifically, as the photo-alignment compound, a compound aligned by trans-cis photoisomerization; a compound aligned by photo-destruction such as chain scission or photo-oxidation; a compound aligned by photo-crosslinking or photopolymerization such as [2+2] cycloaddition, [4+4] cycloaddition or photodimerization; a compound aligned by photo-Fries rearrangement; or a compound aligned by a ring opening/closure reaction; and the like, can be used.

As the compound aligned by trans-cis photoisomerization, for example, azo compounds such as sulfonated diazo dyes or azo polymers, or stilbenes, and the like can be exemplified.

As the compound aligned by photo-destruction, cyclobutane-1,2,3,4-tetracarboxylic dianhydride; aromatic polysilanes or polyesters; polystyrenes; or polyimides; and the like can be exemplified.

As the compound aligned by photo-crosslinking or photopolymerization, a cinnamate compound, a coumarin compound, a cinnamamide compound, a tetrahydrophthalimide compound, a maleimide compound, a benzophenone compound, a diphenylacetylene compound, a compound having a chalconyl moiety (hereinafter, a chalcone compound) or a compound having an anthracenyl moiety (hereinafter, an anthracenyl compound), as the photosensitive moiety, can be exemplified.

The photo-alignment compound may be a monomolecular compound, a monomeric compound, an oligomeric compound or a polymeric compound, or may be in a blend form of the photo-alignment compound and a polymer. Here, the oligomeric or polymeric compound may have a residue derived from the above-described photo-alignment compound, or the above-described photosensitive moiety in the main chain or side chains.

As the polymer having the residue derived from the photo-alignment compound, or the photosensitive moiety or capable of being mixed with the photo-alignment compound, polynorbornenes, polyolefins, polyarylates, polyacrylates, poly(meth)acrylates, polyimides, poly(amic acid)s, polymaleinimides, polyacrylamides, polymethacrylamides, polyvinyl ethers, polyvinyl esters, polystyrenes, polysiloxanes, polyacrylonitriles or polymethacrylonitriles, and the like, can be exemplified, without being limited thereto.

As the polymer that can be included in the alignment compound, typically, polynorbornene cinnamate, polynorbornene alkoxy cinnamate, polynorbornene allyloyloxycinnamate, polynorbornene fluorinated cinnamate, polynorbornene chlorinated cinnamate, or polynorbornene dicinnamate, and the like, can be exemplified, without being limited thereto.

The photo-alignment film can be formed, for example, by combining the photo-alignment compound with necessary additives such as a photoinitiator, coating it, and then irradiating it with the polarized ultraviolet in a desired direction, and the like.

The alignment film included in the liquid crystal window of the present application may be formed in combination with the processes for forming the rubbing alignment film or the photo-alignment film as described above, but is not limited thereto.

The liquid crystal window may further comprise an electrode layer capable of applying an external action, for example, an external electric field to the liquid crystal layer.

The electrode layer may have a high light transmittance in a visible light region, for example.

In one example, the electrode layer may have a transmittance of 80% or more, 85% or more, or 90% or more for light having any one wavelength in a visible light region, for example, in a range of about 400 nm to 700 nm, or a wavelength of 550 nm.

The electrode layer also has a low light transmittance in an infrared region, so it may have a high electric conductivity and a low sheet resistance value as well as an effect of blocking heat.

In one example, the electrode layer may have a transmittance of 70% or less, 65% or less, or 60% or less for light having any one wavelength in an infrared region, for example, in a range of about 700 nm to 1000 nm, or a wavelength of 780 nm or more. Since the electrode layer satisfying the above numerical range can block heat in the infrared region, for example, energy saving is possible. The lower limit of the light transmittance of the electrode layer in the infrared region is not particularly limited, but the lower limit may be, for example, 0% or more, or 5% or more.

The electrode layer may have a sheet resistance value of 20Ω/□ or less, 15Ω/□, or 10Ω/□ or less, and the lower limit is not particularly limited, but may be 0.1Ω/□ or more. When the electrode layer having the sheet resistance value in the above numerical range is applied to the optical device, the power consumption can be minimized, so that there is an advantage that the efficiency of the optical device can be increased.

As long as the material of the electrode layer is one having the light transmittance and the sheet resistance value and capable of applying an appropriate external action to change the orientation of the liquid crystal compound, any known one may be used without limitation.

For example, the electrode layer may utilize metal oxides; metal wires; metal nanotubes; metal meshes; carbon nanotubes; graphenes; or conductive polymers or composite materials thereof.

In one example, the electrode layer may comprise a metal oxide comprising at least one metal selected from the group consisting of antimony (Sb), barium (Ba), gallium (Ga), germanium (Ge), hafnium (Hf), indium (In), lanthanum (La), magnesium (Mg), selenium (Se), aluminum (Al), silicon (Si), tantalum (Ta), titanium (Ti), vanadium (V), yttrium (Y), zinc (Zn), and zirconium (Zr).

The thickness of the electrode layer can be suitably selected within a range that does not impair the purpose of the present application. For example, in order to exhibit high light transmittance in the visible light region, low light transmittance in the infrared region, excellent electrical conductivity and low resistance characteristics, the thickness of the electrode layer can be adjusted within the range of 50 nm to 300 nm or 70 nm to 200 nm.

The electrode layer may be a single layer structure comprising the above-described material or a laminated structure, and when it is a laminated structure, the materials constituting each layer may be the same or different.

The liquid crystal window of the present application may further comprise a sealant located on both sides of the liquid crystal layer. As shown in FIG. 2, such a sealant can serve to seal the liquid crystal compound in the liquid crystal layer simultaneously with maintaining a gap of the liquid crystal layer by being located at the sides of the liquid crystal layer.

In one example, the sealant may be a polymer layer. Such a polymer layer may be, for example, a type capable of thermal curing, UV curing or thermal curing and UV curing together.

In one example, the sealant may be an acrylic polymer layer comprising polymerized units of (meth)acrylic acid esters.

The (meth)acrylic acid ester means methacrylic acid or acrylic acid or derivatives thereof, where the specific (meth)acrylic acid ester may be an alkyl (meth)acrylate having an alkyl group having 1 to 14 carbon atoms, and examples thereof may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, isobutyl (meth)acrylate, 2-ethylhexyl (meth)acrylate, 2-ethylbutyl (meth)acrylate, pentyl (meth)acrylate, hexyl (meth)acrylate, n-octyl (meth)acrylate, decyl (meth)acrylate, dodecyl (meth)acrylate, tridecyl (meth)acrylate, octadecyl (meth)acrylate, isooctyl (meth)acrylate, isononyl (meth)acrylate or tetradecyl (meth)acrylate, and the like, but are not limited thereto.

In addition, the acrylic polymer layer may further comprise polymerized units of a monomer having other crosslinkable functional groups. As the monomer having other crosslinkable functional groups, for example, a monomer having a hydroxyl group such as hydroxyalkyl (meth)acrylate, for example, 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, 2-hydroxypolyethylene glycol (meth)acrylate or 2-hydroxypolypropylene glycol (meth)acrylate; or a monomer having a carboxyl group such as (meth)acrylic acid, 2-(meth)acryloyloxyacetic acid, 3-(meth)acryloyloxypropionic acid, 4-(meth) acryloyloxybutyric acid, acrylic acid dimer, itaconic acid, maleic acid or maleic anhydride, and the like, can be exemplified, without being limited thereto.

The sealant may have a thickness, for example, in the range of 5 to 30 μm, where the gap of the liquid crystal layer may be properly maintained within this range, and it may serve to seal the liquid crystal layer.

In one example, the sealant may have a width of 3 mm to 15 mm, without being limited thereto, and the above numerical value may be changed according to the purpose of introducing the sealant and the length of the liquid crystal layer.

The sealant may have, for example, an area of 30% or less, 20% or less, 10% or less, or 1% or less relative to the area of the liquid crystal window surface. The area means the ratio of the surface that the sealant is in contact with the alignment film and the like. Within this area range, the sealant may serve to maintain the gap of the liquid crystal layer and to seal the liquid crystal layer, and may not hinder variable characteristics of transmittance of the liquid crystal compound in the liquid crystal layer.

In addition to the above-mentioned polymer, the sealant may further comprise an appropriate additive in order to control variable characteristics of transmittance, or rigidity. For example, the sealant may further comprise an appropriate amount of the known inorganic particles, inorganic pigments, and the like in order to control variable characteristics of transmittance, or rigidity and the like.

The liquid crystal window included in the optical device of the present application may further comprise a spacer. The spacer may be one formed so as to maintain gaps of the layers existing at the top and bottom of the liquid crystal layer. The spacer may exist, for example, in a region where the liquid crystal compound of the liquid crystal layer is not present.

The spacer may be, for example, a state formed on any one layer of the upper and lower layers existing adjacent to the liquid crystal layer and attached to the other layer by a pressure-sensitive adhesive or an adhesive, or may be present between two layers directly adjacent to the liquid crystal layer.

The spacer applied to the optical device of the present application may be of a suitable color and size so as to be capable of maintaining low haze even in the absence of the external action.

The structure of the spacer may be, for example, a column shape or a ball shape.

In one example, when the spacer is in a column shape, its shape and number, and the spacing between the spacers or the position on the substrate, and the like can be freely designed and changed within the range capable of achieving the purpose of the present application by one skilled in the art.

For example, the column-shaped spacer may comprise 3 to 6 main spacers and each main spacer may comprise 2 to 4 sub-spacers.

As a specific example, the column-shaped spacer may comprise, for example, six main spacers, and each main spacer may comprise four sub-spacers, without being limited thereto.

Also, the spacing between the column-shaped spacers is not particularly limited, and for example, the spacers may be disposed with space in the range of 20 μm to 5,000 μm or 50 μm to 1,000 μm.

In one example, the column-shaped spacer may comprise a curable resin. The kind of the curable resin is not particularly limited, and for example, a thermosetting resin or a photo-curable resin, such as an ultraviolet curable resin, can be used.

As the thermosetting resin, for example, a silicone resin, a silicon resin, a furan resin, a polyurethane resin, an epoxy resin, an amino resin, a phenol resin, a urea resin, a polyester resin or a melamine resin may be used, without being limited thereto.

As the ultraviolet curable resin, typically, an acrylic polymer such as a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer may be used, without being limited thereto.

In another example, the column-shaped spacer may comprise a polymer network and a liquid crystal compound. Specifically, the column-shaped spacer can be formed by imprinting a layer of a composition comprising the polymer network and the liquid crystal compound, but is not limited thereto. As the polymer network and the liquid crystal compound included in the column-shaped spacer, the kind of the polymer network and the liquid crystal layer described above can be used without limitation.

Such a column-shaped spacer may be, for example, a fixed type formed on any one layer adjacent to the liquid crystal layer and attached to the other layer adjacent to the liquid crystal layer via a pressure-sensitive adhesive or an adhesive.

In addition, when the spacer is in a ball shape, it may comprise glass fiber, plastic, silica, or the like, and such a ball-shaped spacer may be, for example, an unfixed type directly interposed between two layers adjacent to the liquid crystal layer.

In a specific example, the spacer may be a black spacer. That is, the optical device according to the present application includes a smart window having a property of varying transmittance depending on the presence or absence of an external action. When the external action is not present in the optical device comprising such a smart window, there may be merely a problem that the initial haze characteristic is reduced by the spacer. However, when a black spacer is introduced into the optical device, a low haze value can be maintained regardless of whether or not the external action is applied. As described above, the black spacer may be in the column shape, or may be in the ball shape, where in the present application, the specific shape of the black spacer is not particularly limited as long as the color of the black spacer is black series.

In one example, the optical device of the present application may have a haze of 10% or less, 9% or less, 8% or less, or 7% or less in the absence of the external action. The upper limit of the haze is not particularly limited, but may be, for example, 1% or more or 2% or more. The haze may be, for example, a value measured using a haze meter (NDH 5000SP) at light having a wavelength of 550 nm.

The liquid crystal window of the present application may further comprise a base layer located on any one side or both sides of the liquid crystal layer.

In one example, the base layer may be located only on any one side of the liquid crystal layer.

Specifically, as shown in FIG. 2, the optical device (1000) of the present application may have a structure which comprises a liquid crystal layer (301), and alignment films (302a,b) and electrode layers (303a,b) sequentially disposed on both sides of the liquid crystal layer (301), and comprises a base layer (305b) that is present in the opposite side of the surface on which a first polarizing layer (200) of the liquid crystal layer (301) is located. In this case, the first polarizing layer (200) may be in direct contact with a liquid crystal window (300). In the present application, the term "B in direct contact with A" means a state in which any layer or configuration is not interposed between A and B.

In addition, reviewing FIG. 2 more, when the liquid crystal window (300) of the optical device (1000) of the present application comprises one base layer (305b), the opposite side of the surface that is in contact with the liquid crystal window (300) of the first polarizing layer (200) may be attached to the first substrate (100a) via a pressure-sensitive adhesive layer or an adhesive layer (400).

As shown in FIG. 2, when the first polarizing layer has a structure which is in direct contact with the liquid crystal window, specifically, a structure that the base layer is located only on the opposite side of the surface on which the first polarizing layer of the liquid crystal layer is located, the bending phenomenon of the device due to the difference in coefficient of thermal expansion (CTE) and elastic modulus among the substrate, the polarizing layer and the base layer, and the like can be prevented, and the desired bending distance of the optical device can be achieved.

In another example, the base layer may be located on both sides of the liquid crystal layer.

Specifically, as shown in FIG. 3, the optical device (1000) of the present application may have a structure which comprises a liquid crystal layer (301), and alignment films (302a,b), electrode layers (303a,b) and base layers (305a,b) sequentially disposed on both sides of the liquid crystal layer (301). In this case, the first polarizing layer (200) may be attached to the liquid crystal window (300) via the pressure-sensitive adhesive layer or the adhesive layer (400) and the opposite side of the surface that is in contact with the liquid crystal window (300) of the first polarizing layer (200) may be attached to the first substrate (100a) via the pressure-sensitive adhesive layer or the adhesive layer (400).

The base layer included in the liquid crystal window may have a predetermined elastic modulus and coefficient of thermal expansion (CTE).

In one example, the base layer may have a coefficient of thermal expansion (CTE) of at least 50 ppm/K, at least 60 ppm/K, at least 70 ppm/K, or at least 80 ppm/K. Within such a range of coefficient of thermal expansion (CTE), the appropriate rigidity can be maintained, and the thermal deformation according to the laminated structure of the liquid crystal window, the polarizing layer and the like can be prevented. The upper limit of the coefficient of thermal expansion (CTE) may be, for example, 300 ppm/K or less, or 200 ppm/K or less, but is not limited thereto. The value of the coefficient of thermal expansion (CTE) may be, for example, a value calculating the average thermal expansion coefficient measured with cooling and heating at a rate of 10° C./min in a temperature range of 0° C. to 100° C. as a coefficient of linear thermal expansion.

The base layer may have, for example, an elastic modulus of 5 GPa or less, 4 GPa or less, or 3 GPa or less. Within such a range of elastic modulus, the appropriate rigidity can be maintained, and the thermal deformation according to the laminated structure of the liquid crystal window, the polarizing layer and the like can be prevented. The lower limit of the elastic modulus may be, for example, 0.5 GPa or more, but is not limited thereto. The elastic modulus value may mean a value measured according to ASTM D882.

It is preferred that the base layer is, for example, a transparent base film having a haze of 5% or less, or 3% or less.

It is also preferred that the base layer has a refractive index at 550 nm of 1.5 to 2.0, or 1.5 to 1.7.

It is preferred that the base layer has a thickness of, for example, 30 to 200 μm, preferably, 40 to 150 μm.

The glass transition temperature of the base layer may be, for example, in the range of 100° C. to 300° C., preferably 100° C. to 150° C.

The material of the base layer is not particularly limited as long as it satisfies the above-mentioned conditions, but may be, for example, a polymeric film formed from polyolefins such as polyethylene and polypropylene; polyesters such as polyethylene terephthalate and polyethylene naphthalate; celluloses such as triacetyl cellulose, diacetyl cellulose, propionyl cellulose, butyl cellulose or acetyl cellulose; polyamides such as 6-nylon or 6,6-nylon; acrylic polymers such as polymethyl methacrylate; organic polymers such as polystyrene, polyvinyl chloride, polyimide, polyvinyl alcohol, polycarbonate or ethylene vinyl alcohol, or a glass substrate.

Also, the base layer may be one formed from one or two or more of mixtures or polymers, or may be one having a structure laminating a plurality of layers.

The base layer may be one whose surface has been modified. The surface modification is carried out for the purpose of securing the adhesive force with the electrode layer, for which a treatment method such as chemical treatment, corona discharge treatment, mechanical treatment, ultraviolet (UV) treatment, active plasma treatment or glow discharge treatment may be adopted, but is not limited thereto.

For example, the above base layer can be prepared by blending the above-mentioned material with a known mixer (e.g., Omni mixer or the like), mixing the obtained mixture with a known mixer (e.g., an extruder such as a single screw extruder and a twin screw extruder, or a pressurized kneader or the like), and then performing a known film forming method (e.g., solution casting method, melt extrusion method, calendering method, compression molding method, etc.), and in particular, it is preferably prepared by solution casting method or melt extrusion method.

Such a base layer may be located on one side or both sides of the liquid crystal layer.

When the base layer in the liquid crystal window is located only on one side of the liquid crystal layer, the first polarizing layer may have a structure directly contacting the liquid crystal window, thereby achieving excellent durability of the optical device, as described above. At this time, the opposite side of the surface of the first polarizing layer, which is in contact with the liquid crystal window, may be attached to the first substrate via a pressure-sensitive adhesive layer or an adhesive layer.

In the pressure-sensitive adhesive layer or the adhesive layer interposed between the first polarizing layer and the first substrate, for example, known pressure-sensitive adhesives or adhesives such as acrylic-based; epoxy-based; urethane-based; or rubber-based pressure-sensitive adhesives or adhesives may be utilized without limitation.

For example, the pressure-sensitive adhesive layer or the adhesive layer may have a gel content (%) represented by the following formula 3, within a range of 30 to 95%.

$$\text{Gel content (\%)} = B/A \times 100 \qquad \text{[Formula 3]}$$

In Formula 3 above, A represents a mass of a pressure-sensitive adhesive layer or an adhesive layer, and B represents a dry mass of the insoluble matter of the pressure-sensitive adhesive layer or the pressure-sensitive adhesive layer after immersing it in ethyl acetate at room temperature for 72 hours. If the gel content is less than 30%, there is a concern that the endurance reliability is deteriorated under high temperature and/or high temperature and humidity conditions, and if the gel content exceeds 95%, there is a concern that the stress relaxation characteristics of the pressure sensitive adhesive layer or the adhesive layer is deteriorated.

The pressure-sensitive adhesive layer or the adhesive layer may have a thickness within a range of, for example, 10 μm to 100 μm. Within such a thickness range, excellent mechanical properties can be achieved, while exhibiting the desired pressure-sensitive adhesion or adhesion properties.

The pressure-sensitive adhesive layer may have, for example, a dynamic viscosity at 25° C. within a range of 10,000 cSt to 10,000,000 cSt. In particular, the pressure-sensitive adhesive layer having the dynamic viscosity within the range of 10,000 cSt to 100,000 cSt can be referred to as a fluid pressure-sensitive adhesive layer.

That is, the term "fluid pressure-sensitive adhesive layer" in the present application may mean a layer formed from a pressure-sensitive adhesive that a compound for forming the pressure-sensitive adhesive layer is not cured for the dynamic viscosity at 25° C. to be within a range of 10,000 cSt to 100,000 cSt.

In the structure of the optical device of the present application, when the base layer in the liquid crystal window is located on both sides of the liquid crystal layer, the first polarizing layer may have the structure attached to the liquid crystal window via the pressure-sensitive adhesive layer or the adhesive layer, as described above, where the pressure-sensitive adhesive layer or the adhesive layer attaching the first polarizing layer and the liquid crystal window may be, for example, the above-mentioned fluid pressure-sensitive adhesive layer.

In the material for forming the fluid pressure-sensitive adhesive layer, a known material as an uncured type pressure-sensitive adhesive satisfying the above-mentioned dynamic viscosity range can be utilized without limitation.

In one example, the fluid pressure-sensitive adhesive layer may be exemplified by silicone oil or the like, but is not limited thereto.

The elastic modulus of the fluid pressure-sensitive adhesive layer may be, for example, in a range of 8,000 kg/cm$^2$ to 13,000 kg/cm$^2$ at 25° C.

When the first polarizing layer and the liquid crystal window are adhered to each other via such a fluid pressure-sensitive adhesive layer, a phenomenon of intensifying stress in the device due to thermal deformation according to the difference in coefficient of thermal expansion (CTE) and elastic modulus among the substrate, the polarizing layer and the base layer, can be prevented, and ultimately, the bending phenomenon can be effectively prevented.

In addition, the optical device of the present application may have a structure in which the first substrate and the first polarizing layer are in direct contact with each other when the optical device is a structure having base layers on both sides of the liquid crystal layer. Here, the optical device may further comprise a second substrate located on the opposite side of the surface where the first polarizing layer of the liquid crystal window contacts.

That is, when the optical device of the present application is a structure comprising base layers on both sides of the liquid crystal layer, the first polarizing layer may be attached to the first substrate via a pressure-sensitive adhesive layer or an adhesive layer as shown in FIG. 3, or both sides of the first polarizing layer may be in direct contact with the first substrate and the liquid crystal window as shown in FIG. 4. In this case, the optical device may further comprise a second substrate located on the opposite side of the surface where the first polarizing layer of the liquid crystal window contacts.

FIG. 4 is an illustrative diagram of an optical device according to the present application. Specifically, as shown in FIG. 4, the optical device (1000) may be a structure which comprises alignment films (302a,b), electrode layers (303a, b) and base layers (305a,b) sequentially disposed on both sides of a liquid crystal layer (301), wherein any one side of a first polarizing layer (200) is in direct contact with the base layer (305a) of the liquid crystal window (300) and the other side of the first polarizing layer (200) is in direct contact with a first substrate (100a), and further comprises a second substrate (100b) located on the opposite side of the surface where the first polarizing layer (200) is in contact with the first substrate (100a).

That is, in the case of the optical device having the structure as shown in FIG. 4, since the liquid crystal window and the polarizing layer are not attached via the pressure-sensitive adhesive layer or the adhesive layer and the first and second substrates do not attach the polarizing layer or the liquid crystal window via the pressure-sensitive adhesive layer or the adhesive layer as well, the polarizing layer and the liquid crystal window can move freely between the substrates, and thus the phenomenon of intensifying stress due to the difference in thermal deformation among the substrate, the polarizing layer and the base layer, and the resulting problem of increasing bending distance may not occur.

The specific types of the second substrate are the same as those described in the first substrate, and the specific materials of the first substrate and the second substrate may be the same or may be changed within a range that does not impair the above-mentioned object.

The optical device of the present application may also comprise a viewing angle compensation film. The viewing angle compensation film may be a single layer structure or a laminated structure including, for example, an A plate, a +B plate, a −B plate, and a +C plate. Such a viewing angle compensation film is a configuration that can be applied, for example, when the liquid crystal compound in the liquid crystal layer is in a twist oriented ECB mode.

The present application also relates to a use of the optical device. The optical device of the present application can vary the transmittance depending on whether or not an external signal is applied, and can effectively prevent a stress strengthening due to the difference in thermal deformation and the resulting bending phenomenon. Such an optical device can be applied to and used in various optical apparatuses.

That is, the present application is directed to a transmittance variable member comprising an optical device. The transmittance variable member may be, for example, a sunroof.

In the present application, the term "sunroof" is a fixed or operating (venting or sliding) opening present in the ceiling of a vehicle, and may be a collective meaning for apparatuses which are capable of functioning to allow light or fresh air to enter the interior of the vehicle. The manner of operating the sunroof in the present application is not particularly limited, and the sunroof may be, for example, manually operated or motor-driven, and the shape, size or style of the sunroof may be appropriately selected depending on the intended use. For example, the sunroof may be exemplified by a pop-up type sunroof, a spoiler (tile & slide) type sunroof, an in-built type sunroof, a folding type sunroof, a top-mount type sunroof, a panoramic loop system type sunroof, a removable roof panels (t-tops or targa roofs) type sunroof or a solar type sunroof, and the like, but is not limited thereto.

The exemplary sunroof of the present application may comprise the optical device of the present application, and in this case, the specific details of the optical device can be applied equally by those described in the item of the optical device.

The sunroof may further comprise an ultraviolet blocking layer. The term "ultraviolet blocking layer" herein may mean a known functional layer having an ultraviolet blocking function. The ultraviolet blocking layer may be formed on one side or both sides of the polarizing layer, the liquid crystal layer, or the electrode layer. As such an ultraviolet blocking layer, for example, an ultraviolet blocking pressure-sensitive adhesive or an ultraviolet blocking film can be used. As the ultraviolet blocking pressure-sensitive adhesive, a pressure-sensitive adhesive, in which a known additive having an ultraviolet blocking function is added to a known pressure-sensitive adhesive component, may be used. As the ultraviolet blocking film, for example, those that a layer comprising a known additive having an ultraviolet blocking function is formed on one side of a known pressure-sensitive adhesive may be used. As the ultraviolet blocking pressure-sensitive adhesive, for example, EW1501-D1-UV, EW1502-D1-UV or EW1504-D1-UV from DAIO Paper Co. may be used, without being limited thereto.

Advantageous Effects

The present application relates to a transmittance variable optical device and a use thereof.

The optical device according to the present application can effectively control the stress strengthening phenomenon capable of being caused depending on the difference in physical properties between the respective layers and the resulting bending phenomenon of the device.

The optical device according to the present application can also have a low haze value even in the absence of the external action.

BRIEF DESCRIPTION OF DRAWINGS

FIGS. 1 to 4 are one illustrative diagram of an optical device according to the present application.

MODE FOR INVENTION

Hereinafter, the present application will be described in more detail by way of examples, but they are only examples limited to the gist of the present application. Furthermore, it is apparent to those skilled in the art that the present application is not limited to the process conditions set forth in the following examples and the conditions may be optionally selected within the range of conditions necessary for achieving the object of the present application.

Example 1

According to the following method, an optical device having the structure as shown in FIG. 2 was produced.

After an ITO electrode layer was formed on a PET base layer and another ITO electrode layer was formed on a known absorptive type linear polarizing layer, photo-alignment films to induce horizontal orientation of a liquid crystal compound were formed on two ITO electrode layers. Then, a liquid crystal layer (thickness: about 15 µm) comprising a liquid crystal compound (HPC21600, manufactured by HCCH) and an anisotropic dye (X12, manufactured by BASF) in a ratio of 1 to 3 parts by weight relative to 100 parts by weight of the liquid crystal compound was formed on the PET base layer on which the ITO electrode layer and the photo-alignment film were formed, and the sides were sealed. Then, the absorptive type linear polarizing layer on which the photo-alignment film and the ITO electrode layer were formed and the PET base layer on which the liquid crystal layer was formed were bonded together to manufacture a structure in which the liquid crystal window and the polarizing layer were integrally formed, as shown in FIG. 2. Then, the opposite side of the surface of the polarizing layer in contact with the liquid crystal window was bonded together to a glass substrate via OCA (EW1501-D1-UV from DAIO Paper Co., Ltd.) to prepare an optical device. The optical axes of the polarizing layer and the liquid crystal layer were formed to have an angle of about 90 degrees.

Example 2

According to the following method, an optical device having the structure shown in FIG. 3 was produced.

An ITO electrode layer and a horizontal photo-alignment film were formed on a pair of polycarbonate base layers, respectively. Then, a twist nematic liquid crystal layer (thickness: about 15 µm) comprising a liquid crystal compound (HPC21600, manufactured by HCCH), a chiral agent (LC756 from BASF), and an anisotropic dye (X12, manufactured by BASF) in a ratio of 1 to 3 parts by weight relative to 100 parts by weight of the liquid crystal compound was formed on the polycarbonate base layer on which the ITO electrode layer and the photo-alignment film were formed, and the sides were sealed. In addition, two polycarbonate base layers were bonded together to prepare a liquid crystal window having the structure as shown in FIG. 3. Then, the liquid crystal window was attached to any one side of a known absorptive type linear polarizing layer via a fluid pressure-sensitive adhesive layer (silicone oil), and the surface of the polarizing layer to which the liquid crystal window was not attached was bonded together to a glass substrate via OCA (EW1501-D1-UV from DAIO Paper Co., Ltd.) to prepare an optical device like the structure shown in FIG. 3. At this time, the long axis direction of the liquid crystal compound in the liquid crystal layer located close to the polarizing layer forms an angle of about 0 degree with the absorption axis of the polarizing layer, and the long axis direction of the liquid crystal compound in the liquid crystal layer located away from the polarizing layer forms an angle of about 90 degrees with the absorption axis of the polarizing layer.

Example 3

According to the following method, an optical device having the structure as shown in FIG. 4 was produced.

An ITO electrode layer and a horizontal photo-alignment film were formed on a pair of polycarbonate base layers, respectively. Then, a twist nematic liquid crystal layer (thickness: about 15 µm) comprising a liquid crystal compound (HPC21600, manufactured by HCCH), a chiral agent (LC756 from BASF), and an anisotropic dye (X12, manufactured by BASF) in a ratio of 1 to 3 parts by weight relative to 100 parts by weight of the liquid crystal compound was formed on the polycarbonate base layer on which the ITO electrode layer and the photo-alignment film were formed, and the sides were sealed. In addition, two polycarbonate base layers were bonded together to prepare a liquid crystal window having the structure as shown in FIG. 4. After the liquid crystal window and a known absorptive type linear polarizing layer were laminated without interposing the adhesive layer or the adhesive layer, a pair of glass substrates were laminated on the outside of the liquid crystal window and the absorptive type linear polarizing layer to prepare an optical device having the structure shown in FIG. 4. At this time, the long axis direction of the liquid crystal compound in the liquid crystal layer located close to the polarizing layer forms an angle of about 0 degree with the absorption axis of the polarizing layer, and the long axis direction of the liquid crystal compound in the liquid crystal layer located away from the polarizing layer forms an angle of about 90 degrees with the absorption axis of the polarizing layer.

Example 4

An optical device was prepared in the same structure and manner as Example 1, except that in the process of forming the optical device according to Example 1, a black spacer was formed and then two layers were bonded together to produce a liquid crystal window.

Example 5

An optical device was prepared in the same structure and manner as Example 2, except that in the process of forming the optical device according to Example 2, a black spacer was formed and then two layers were bonded together to produce a liquid crystal window.

Example 6

An optical device was prepared in the same structure and manner as Example 3, except that in the process of forming the optical device according to Example 3, a black spacer was formed and then two layers were bonded together to produce a liquid crystal window.

Comparative Example 1

An optical device having the following structure was produced.

Specifically, after preparing a liquid crystal window in the same manner as Example 2, any one side of the liquid crystal window was bonded together to a glass substrate via OCA (EW1501-D1-UV from DAIO Pater, Co., Ltd.) and the other side was bonded together to an absorptive type polarizing layer via OCA (EW1501-D1-UV from DAIO Pater, Co., Ltd.) to prepare an optical device having a structure of glass substrate/OCA/liquid crystal window/OCA/polarizing layer. At this time, the long axis direction of the liquid crystal compound in the liquid crystal layer located close to the polarizing layer forms an angle of 90 degrees with the absorption axis of the polarizing layer, and the long axis direction of the liquid crystal compound in the liquid crystal layer located away from the polarizing layer forms an angle of 0 degrees with the absorption axis of the polarizing layer.

Test Example 1—Durability Test

Specimens (140 mm (width)×98 mm (length)×0.2 mm (height)) of the optical devices prepared according to Examples 1 to 6 and Comparative Example 1 were left at 100° C. for 240 hours, and then it was confirmed whether or not breakage/bending phenomenon of the liquid crystal windows is present and shown in Table 1.

The breakage of the device was visually checked and evaluated as O (with breakage) and X (without breakage), and the bending distance of the device was measured for a portion deformed and dented inward from both edges of the longest side of only the device without breakage by a vernier caliper.

Test Example 2—Evaluation of Transmittance and Haze Characteristics

For the optical devices prepared in Examples 1 to 3 and Comparative Example 1, after connecting a power source capable of applying a vertical electric field thereto, the transmittance of the optical device for light of about 550 nm according to the driving voltage (20V) was measured using a haze meter NDH 5000SP [manufacturer: Nippon Denshoku (JAPAN)]. In addition, for the optical devices prepared in Examples 4 to 6 and Comparative Example 1, the haze was measured using a haze meter NDH 5000SP [manufacturer: Nippon Denshoku (JAPAN)), and the results were shown in Table 2.

TABLE 1

|  | Ex. 1 | Ex. 2 | Ex. 3 | Ex. 4 | Ex. 5 | Ex. 6 | C. Ex. 1 |
|---|---|---|---|---|---|---|---|
| Liquid crystal window breakage | X | X | X | X | X | X | O |
| Bending distance | 1 mm or less | 1 mm or less | 0 mm | 1 mm or less | 1 mm or less | 0 mm | — |

(Ex.: Example; C. Ex.: Comparative Example)

TABLE 2

| Driving Evaluation (%) |  | Ex. 1 | Ex. 2 | Ex. 3 | Ex. 4 | Ex. 5 | Ex. 6 | C. Ex. 1 |
|---|---|---|---|---|---|---|---|---|
| Transmittance | 0 V | 1.21 | 1.51 | 1.14 | 1.35 | 1.41 | 1.34 | 1.36 |
|  | 20 V | 24.6 | 25.0 | 26.2 | 24.8 | 25.2 | 26.1 | 25.0 |
| Haze | 0 V | — | — | — | 4.96 | 4.88 | 4.54 | 12.2 |
|  | 20 V | — | — | — | 3.02 | 3.05 | 3.56 | 2.36 |

(Ex.: Example; C. Ex.: Comparative Example)

DESCRIPTION OF REFERENCE NUMERALS

1000: optical device
100 a, b: first and second substrates
200: first polarizing layer
300: liquid crystal window
301: liquid crystal layer
302 a, b: alignment films
303 a, b: electrode layers
304: sealant
305 a, b: base layers
400: pressure-sensitive adhesive layer or adhesive layer

INDUSTRIAL APPLICABILITY

The optical device according to the present application can effectively control the stress strengthening phenomenon capable of being caused depending on the difference in physical properties between the respective layers and the resulting bending phenomenon of the device, and can have a low haze value even in the absence of the external action.

The invention claimed is:

1. An optical device comprising:
   a first substrate;
   a first polarizing layer disposed adjacent to said first substrate; and
   a liquid crystal window comprising a liquid crystal layer having a thickness of 5 μm to 30 μm and comprising a liquid crystal compound, the liquid crystal window located on an opposite side of said first polarizing layer from where the first substrate is located,
   wherein transmittance of the optical device varies depending on whether or not an external field is applied,
   wherein a bending distance of the optical device is 3 mm or less after a heat resistance test at a temperature of 100° C. for 240 hours, and
   wherein:
      the liquid crystal window comprises base layers located on both sides of the liquid crystal layer, and the first polarizing layer is attached to the liquid crystal window via a fluid pressure-sensitive adhesive layer having the dynamic viscosity within a range of 10,000 cSt to 100,000 cSt and an elastic modulus within a range of 8,000 kg/cm$^2$ to 13,000 kg/cm$^2$ at 25° C.

2. The optical device according to claim 1, wherein the liquid crystal compound is in a horizontal orientation, a vertical orientation or an oblique orientation in the absence of the external field.

3. The optical device according to claim 1, further comprising
   a second polarizing layer located on the opposite side of the surface on which the first polarizing layer of the liquid crystal window is located.

4. The optical device according to claim 1, wherein the liquid crystal layer further comprises an anisotropic dye.

5. The optical device according to claim 1, wherein the liquid crystal window further comprises an alignment film disposed adjacent to the liquid crystal layer.

6. The optical device according to claim 1, wherein the liquid crystal window further comprises an electrode layer.

7. The optical device according to claim 1, wherein the liquid crystal window further comprises a sealant located on both sides of the liquid crystal layer.

8. The optical device according to claim 1, wherein the liquid crystal window further comprises a spacer formed to be capable of maintaining gaps of the layers existing at the top and bottom of the liquid crystal layer.

9. The optical device according to claim 8, wherein the spacer is a black spacer.

10. The optical device according to claim 1, wherein a second substrate is present.

11. The optical device according to claim 1, further comprising a viewing angle compensation film.

12. A transmittance variable member comprising the optical device of claim 1.

* * * * *